United States Patent
Blomqvist

[19]

[11] Patent Number: 6,014,127

[45] Date of Patent: *Jan. 11, 2000

[54] CURSOR POSITIONING METHOD

[75] Inventor: Per Blomqvist, Huntsville, Ala.

[73] Assignee: Intergraph Corporation, Huntsville, Ala.

[*] Notice: This patent is subject to a terminal disclaimer.

[21] Appl. No.: 09/026,955

[22] Filed: Feb. 20, 1998

Related U.S. Application Data

[63] Continuation of application No. 08/573,689, Dec. 18, 1995, Pat. No. 5,745,099.

[51] Int. Cl.[7] ...................................................... G09G 5/08
[52] U.S. Cl. ............................ 345/145; 345/339; 345/964
[58] Field of Search .................................... 345/145, 156, 345/157, 158–168, 433, 133, 339, 964

[56] References Cited

U.S. PATENT DOCUMENTS

| 5,123,087 | 6/1992 | Newell et al. ........................... 395/155 |
|---|---|---|
| 5,299,307 | 3/1994 | Young ..................................... 345/157 |
| 5,327,528 | 7/1994 | Hidaka et al. ........................... 395/155 |
| 5,361,308 | 11/1994 | Lee et al. ..................................... 382/8 |
| 5,565,887 | 10/1996 | McCambridge et al. ............... 345/145 |

FOREIGN PATENT DOCUMENTS

421818 A2   4/1991   European Pat. Off. .

*Primary Examiner*—Matthew Luu
*Attorney, Agent, or Firm*—Townsend and Townsend and Crew LLP

[57] ABSTRACT

A method for positioning a cursor relative to a reference position on the display using the pointing device includes the steps of positioning the cursor at a position on a display with a pointing device, selecting the position as the reference position, the reference position associated with an object, moving the cursor to a plurality of cursor positions not associated with the object on the display with the pointing device, and displaying a plurality of offset values on the display, the offset values being calculated in response to the reference position and the plurality of cursor positions.

36 Claims, 10 Drawing Sheets

CURSOR POSITIONING METHOD

This is a continuation of U.S. application Ser. No. 08/573,689, filed Dec. 18, 1995, now U.S. Pat. No. 5,745,099.

BACKGROUND OF THE INVENTION

The present invention relates generally to computer aided design and computer aided machine (CAD/CAM) tools, and more specifically to positioning objects within CAD/CAM programs or environments.

Methods have previously been provided for drawing and resizing of objects in CAD/CAM programs. For example, when drawing an object on a display, a typical CAD/CAM program translates positioning signals and movements of a cursor on a display into the coordinate system of the program and into the scale of the program, (together "coordinate system"). An illustration of this is when the user clicks and drags a rectangle on the display, the rectangle may appear to be only 2 inches by 1 inch on the display, however, within the program's coordinate system the rectangle may represent a 20 foot by 10 foot room. Typically, as the user creates a rectangle with the cursor on the display, or resizes an existing rectangle with the cursor on the display, the program displays the current size of the rectangle within the program's coordinate system to the user. This size feedback allows the user to more quickly and more precisely define the sizes of objects in the CAD/CAM program.

Although there have been tools for aiding the user in sizing and resizing objects in a CAD/CAM environment, there have not been many tools for aiding the user in positioning objects relative to other objects. One method used to allow a user to position an object relative to an existing object is with coordinate key-ins from a keyboard or dialog boxes. Using this method, the user first defines a reference point, then keys-in an offset distance from the reference point, within the program's coordinate system, where the new object should be located, and then creates the new object.

Figure 1A:
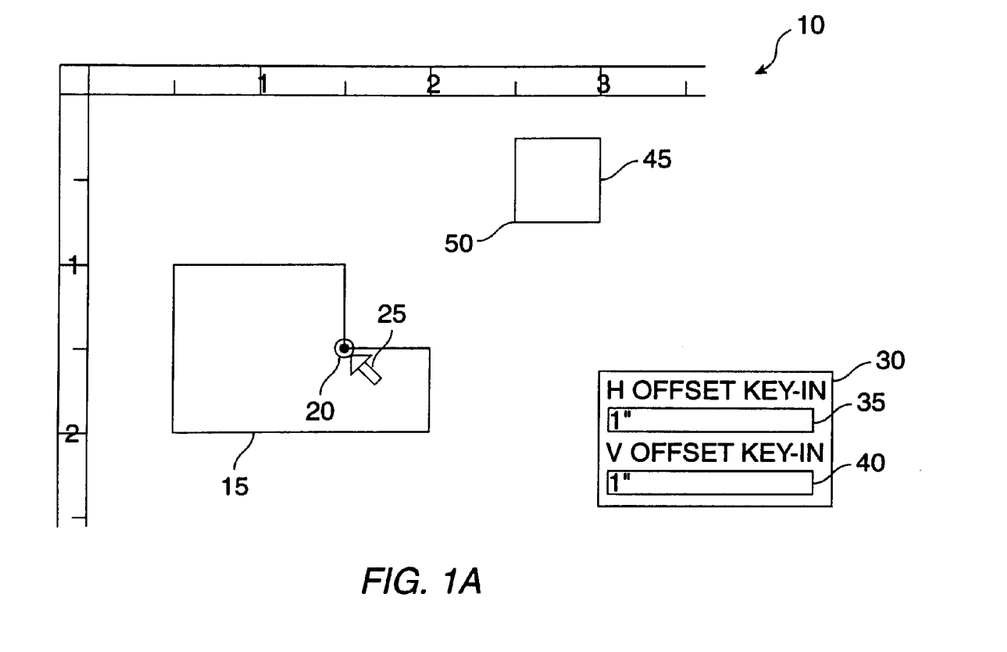
FIG. 1A illustrates one process of positioning objects relative to a reference point.

FIG. 1A illustrates one process of positioning objects relative to a reference point. FIG. 1A includes a screen display 10 of typical CAD/CAM program. Screen display 10 includes object 15 having reference point 20 and cursor 25. Screen display 10 also includes window 30 having horizontal offset dialog box 35 and vertical offset dialog box 40 and object 45 having point 50.

As illustrated in FIG. 1A, typically the user uses cursor 25 to locate a reference point on an object, such as reference point 20 on object 15. Next, the user opens window such as window 30 that includes horizontal offset dialog box 35 and vertical offset dialog box 40. Using a keyboard, the user defines a horizontal offset value and vertical offset value from reference point 25 in the appropriate dialog box. The offset values are added to the coordinates of reference point 25, and the resulting point 50 for example is defined on the display. Once point 50 is defined, the user creates new objects, such as object 45 relative to point 50 as shown.

A drawback with this method is that the user must continually switch her hands back and forth between input devices and move her eyes back and forth between the input devices and the display. For example, the user initially uses the mouse to define the reference point, next the user uses the keyboard to enter the key-ins, and then the user returns to the mouse to define the object. This sort of back and forth movement reduces the user's productivity. Another drawback is that in some programs, the user is sometimes forced to memorize cryptic character combinations (for example, dx=5,2,2.0,1.2 etc . . . ) to accomplish this task.

Another method for aiding the user in positioning objects relative to other objects is with the use of construction lines or construction geometry. For example, to determine a horizontal offset and a vertical offset from a reference point, the user creates a temporary rectangle having dimensions equal to the horizontal offset and the vertical offset. After the temporary rectangle is drawn, the desired object is created relative to a point on the temporary rectangle. After the desired object is created, the temporary rectangle is deleted.

Figure 1B:
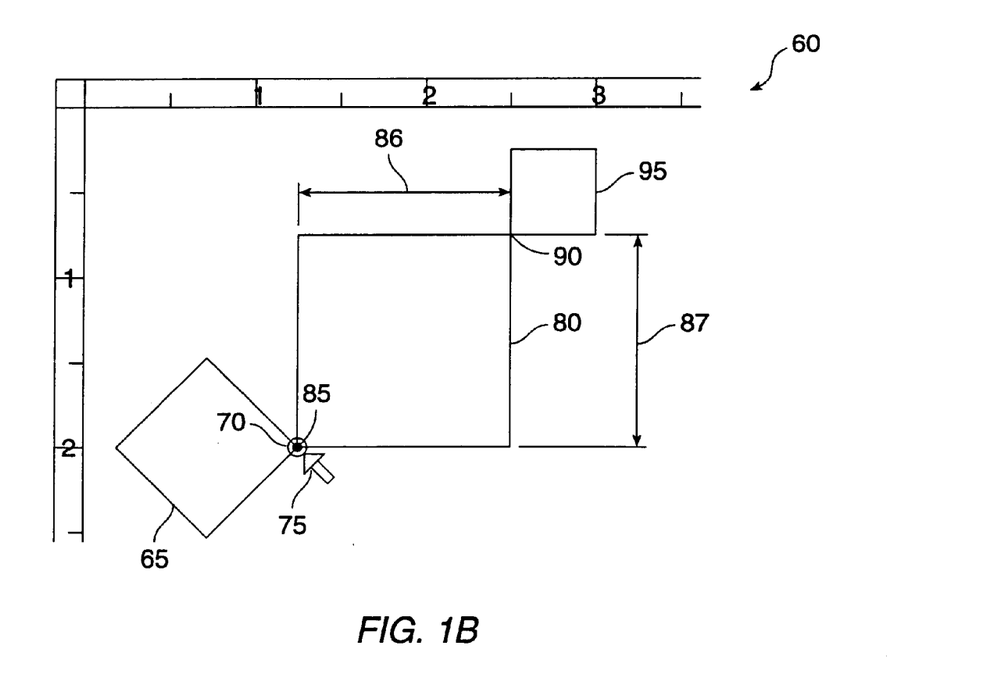
FIG. 1B illustrates another process of positioning objects relative to a reference point.

FIG. 1B illustrates a process of positioning objects relative to a reference point as just described. FIG. 1B includes a screen display 60 of typical CAD/CAM program. Screen display 60 includes object 65 having reference point 70 and cursor 75, temporary rectangle 80 having points 85 and 90, and object 95.

As illustrated in FIG. 1B, typically the user uses cursor 75 to locate a reference point related to, or on, an object, such as reference point 70 on object 65. Next, the user locates cursor 75 at reference point 70 and creates temporary rectangle 80. The user sets the horizontal size 86 and vertical size 87 of temporary rectangle 80 equal to the desired horizontal and vertical offset from reference point 70. Temporary rectangle 80 thus includes point 85 that is coincident with reference point 70, and a point 90 that defines a desired destination point. The user then creates object 95 or moves an existing object 95 so that object 95 has a point coincident with point 90, as illustrated, and then deletes temporary rectangle 80.

A drawback with this method is that the user must go through the exercise of creating construction lines or geometry and then when the user is done positioning objects, deleting the construction lines or geometry. Another drawback is that after the construction lines or geometry are deleted, there is no easy way to determine whether the offsets or the dimensions of the construction lines or geometry are correct without creating new construction lines or geometry, thus the placement of objects relative to reference points may be prone to error.

What is needed are methods that allow a user to quickly and precisely create and position objects relative to other objects in a CADICAM program enviromnent with reduced use of the keyboard and mouse, and without having the user take her eyes off the screen.

SUMMARY OF THE INVENTION

The present invention provides enhancements for CAD/CAM environments that allow the user to quickly and precisely position objects relative to other objects in a highly intuitive and interactive manner. The user is able, with a pointing device, to directly select a reference point on an object, and to locate points relative to the reference point.

Further understanding of the nature and advantages of the invention may be realized by reference to the remaining portions of the specification and drawings.

DESCRIPTION OF THE PREFERRED EMBODIMENT

System Overview

Figure 2:
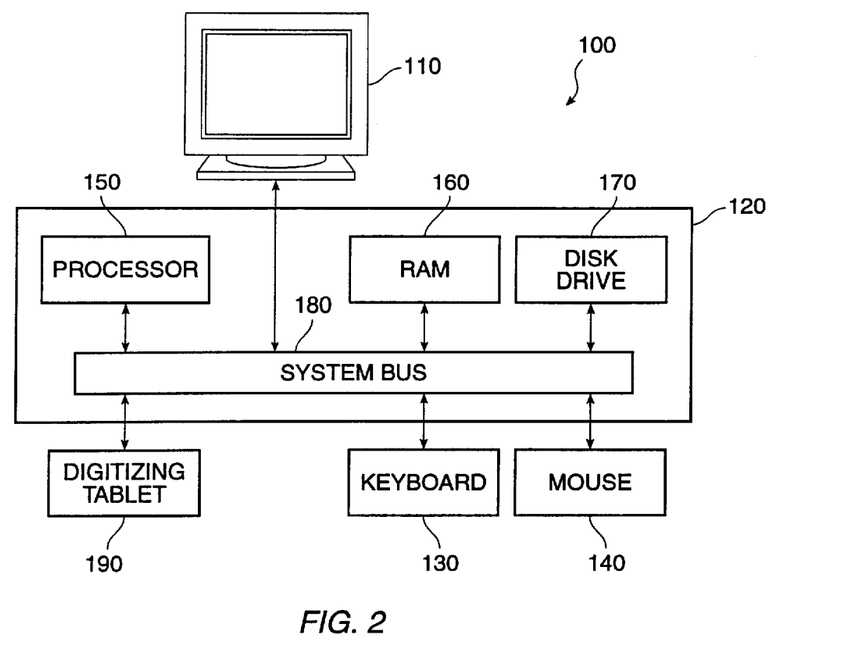
FIG. 2 is a block diagram of a system according to a preferred embodiment of the present invention.

FIG. 2 is a block diagram of a system 100 according to a preferred embodiment of the present invention. System 100 includes a monitor 110, a computer 120, a keyboard 130, and a mouse 140. Computer 120 includes familiar computer components such as a processor 150, and memory storage devices, such as a random access memory (RAM) 160, a disk drive 170, and a system bus 180 interconnecting the above components. Mouse 140 is but one example of a graphical input device, also known as a pointing device, a digitizing tablet 190 is another. RAM 160 and disk drive 170 are examples of tangible media for storage of computer programs, other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, System 100 includes a 586 microprocessor-class based computer, running Windows NT operating system by Microsoft Corporation, and Imagineer™ software from Intergraph Corporation. The software will not be available at the time of filing. A description of a specific embodiment of the present invention is included in the "Intergraph Software Solutions Command Specification-PinPoint" document attached in Appendix A, and hereinby incorporated by reference.

FIG. 2 is representative of but one type of system for embodying the present invention. It will be readily apparent to one of ordinary skill in the art that many system types and configurations are suitable for use in conjunction with the present invention.

Detailed Description

Figure 3:
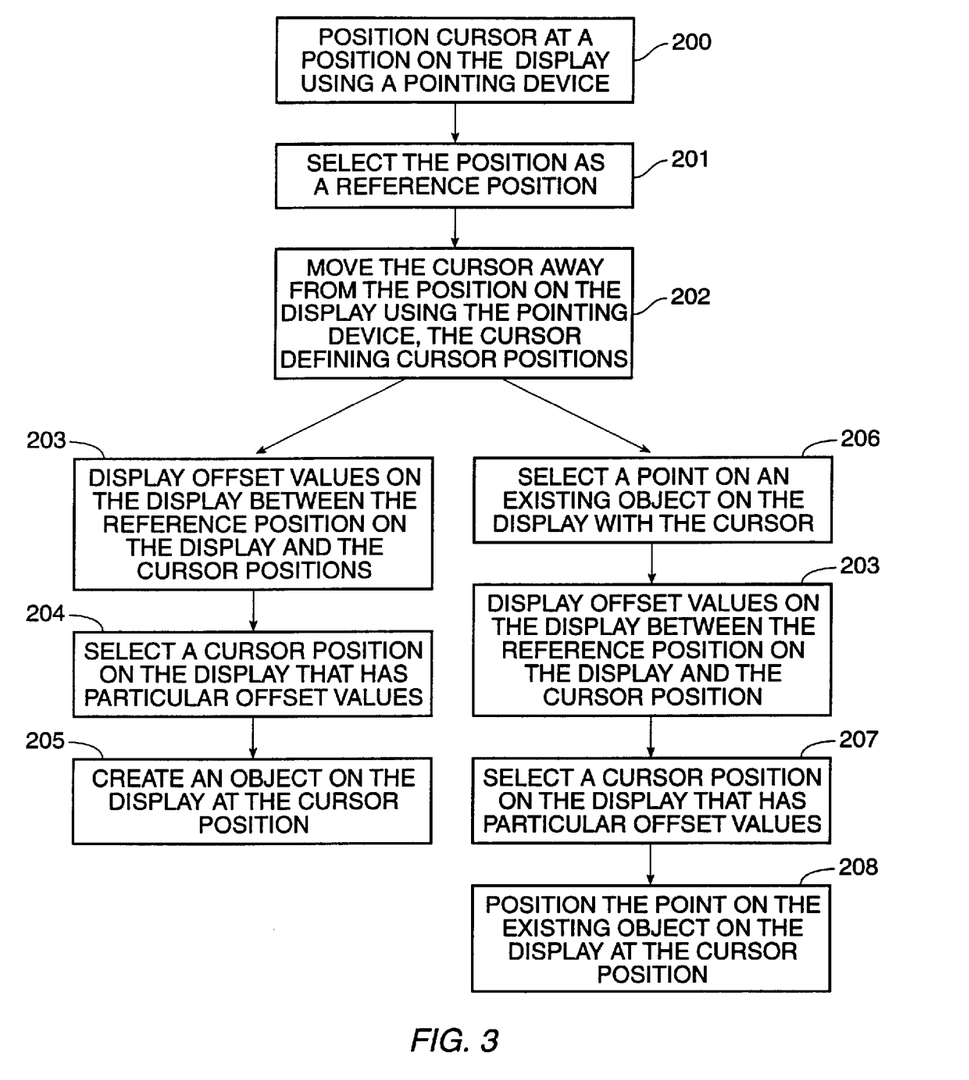
FIG. 3 is a flow diagram of embodiments of the process of positioning a cursor relative to a reference position on the display.

FIG. 3 is a flow diagram of embodiments of the process of positioning a cursor relative to a reference position on the display.

Initially a cursor is positioned on the display at a position the user is interested in using a pointing device such as a mouse (step 200). Next, the user selects the position as a reference position, preferably again using the pointing device (step 201).

After the reference position has been selected, the user moves the cursor on the display to a plurality of points (step 202). As the user moves the cursor on the display to each of the plurality of points, offset values are displayed to the user on the display (step 203). Offset values include the difference in position between each of the plurality of points and the reference position. These offsets are commonly displayed to the user in units of the current document coordinate system.

The user typically observes the offset values on the display and when the user is satisfied with particular offset values, the user selects the cursor position on the display associated with the particular offset values (step 204). In other words, the user moves the cursor on the display until the cursor is positioned at particular offset values away from the reference position.

After the cursor is positioned on the display at a desired cursor position, the user may create a new object on the display. This new object will thus be positioned relative to the reference position (step 205).

Alternatively, before the desired cursor position is selected, the user may select a point on an existing object on the display with the cursor (step 206). The user then moves the point on the existing object on the display (step 207) until the point on the existing object is positioned the particular offset values away from the reference position.

The existing object is thus positioned relative to the reference position (step 208).

The offset values can be displayed to the user using units of the display, for example, number of pixels offset on the display. Also, the offset values can be displayed using the coordinate system of the display, typically an x-y coordinate system. Alternatively, the offset values are translated to the coordinate system of the document, thus instead of a number of pixels offset on the display, the offset values can be inches, feet, meters, degrees, etc. Also, the offset values can be displayed in a user-defined coordinate system, thus instead of just an x-y coordinate offset, the offset values can be a rotated x-y coordinate system, a polar coordinate system, spherical coordinate system, etc. Further details are described below.

Figure 4:
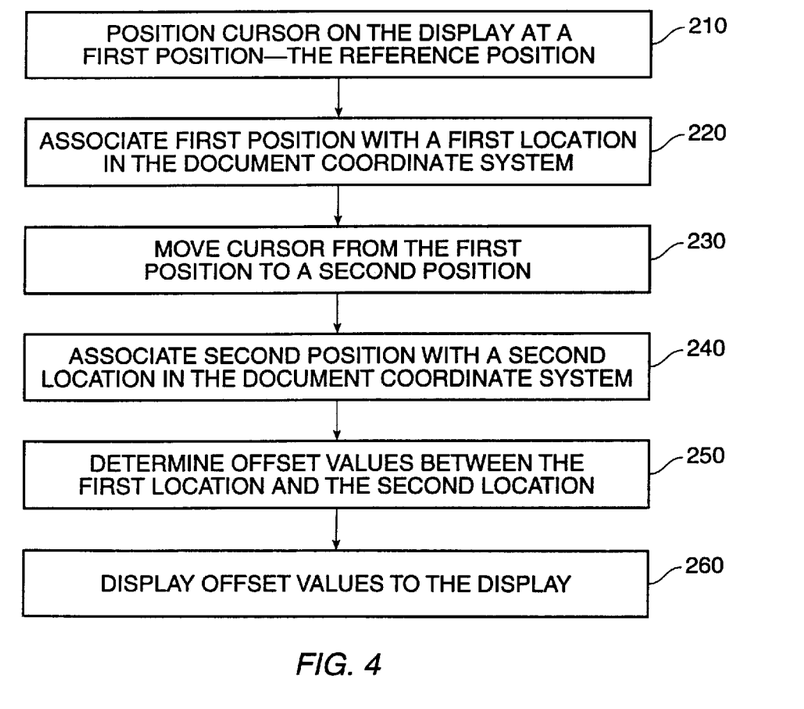
FIG. 4 is a more detailed flow diagram of one embodiment of the process of determining a position of a cursor on the display.

FIG. 4 is a more detailed flow diagram of one embodiment of the process of determining a position of a cursor on the display. In the following description the term "position" refers to a position within a coordinate system of the display whereas the term "location" refers to a location within a coordinate system of a document (typically from within an application program). For instance, a position on the display maps to a location in a document.

Initially a cursor is positioned on the display at a first position using a pointing device, such as a mouse (step 210). In the preferred embodiment of the present invention, the position is typically coincident with a position of a reference point on an object on the display. The reference position may be a position on the surface of the object or may be related to the object, e.g. center of gravity, axis of rotation, etc., for example. The first position is then associated with a first location within a coordinate system defined by the application program (step 220). This step may utilize conventional cursor drivers in addition to software that translates the cursor position to the specific coordinate system of the application program.

Next, the cursor is moved from the first position to a second position (step 230). In the preferred embodiment of the present invention, the second position is simply an arbitrary position on the display that is not coincident the first position. This step is typically performed with the pointing device. Each second position on the display is then associated with a second location within the application program coordinate system (step 240). Again, this step may utilize conventional cursor drivers as described above. In the preferred embodiment of the present invention, the second location is also simply an arbitrary position on the display that is not coincident with the first location.

As opposed to the construction geometry method in the background section, no construction geometry, such as a construction rectangle is needed. Instead, the first position and the second position on the display typically are not associated and do not reside on the same object, such as a construction rectangle or a construction line. In other words, since construction geometry is typically not used, the first position and the second position typically cannot be said to reside upon the same object.

Next, offset values between the first location and the second location, within the coordinate system is determined (step 250). The coordinate system may be predetermined or selected by the user. In the preferred embodiment, a rectangular two-dimensional coordinate system is used, however alternative coordinate systems are envisioned including a polar coordinate system, an orthogonal three-dimensional coordinate system, a spherical coordinate system, etc. The resulting offset values, defined by the coordinate system, are then displayed to the user (step 260), typically on a display. The offset values are typically a number pair for a two dimensional coordinate system, for example $\{x,y\}$ and $\{r,\theta\}$, and a number triplet for a three-dimensional coordinate system, for example $\{x,y,z\}$ and $\{r,\theta,\rho\}$.

Figure 5A:
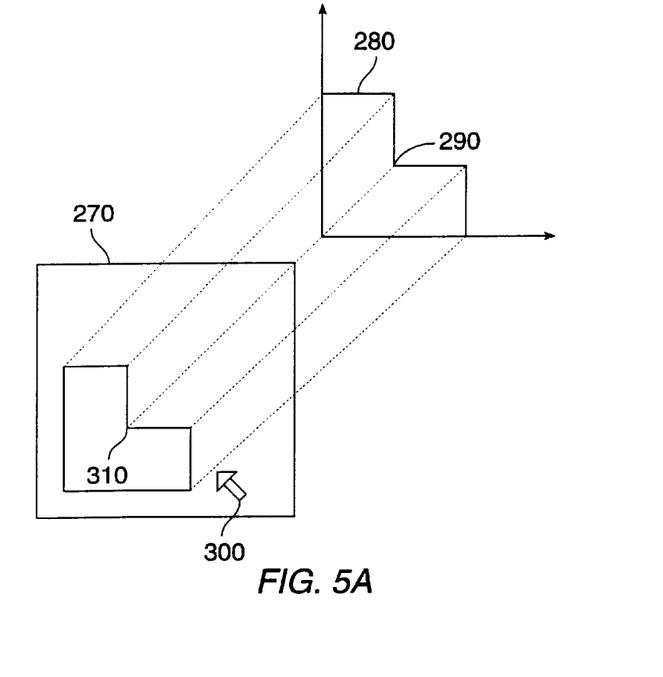
FIGS. 5a and 5b illustrate one embodiment of a step in the present invention.
Figure 5B:
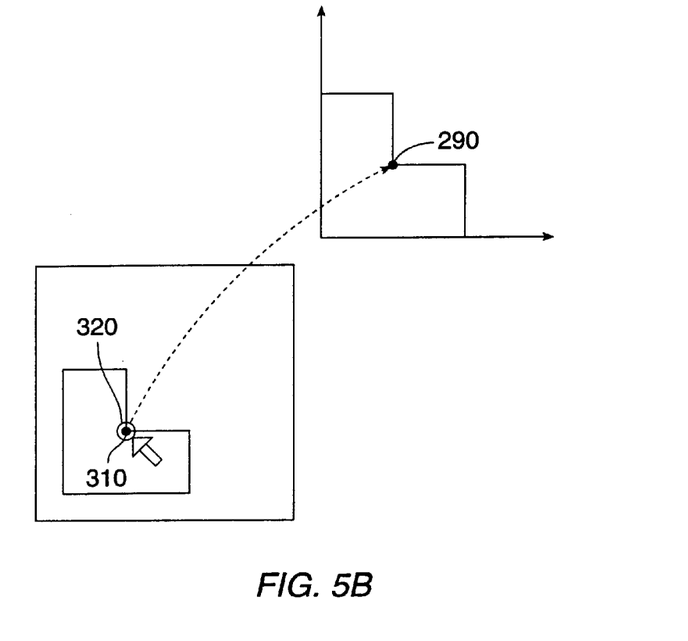

FIGS. 5a and 5b illustrate one embodiment of a step in the present invention. FIG. 5a illustrates a display 270 of an object 280 having corner 290 within an application program. Cursor 300 is also displayed to the user. In the preferred embodiment of the present invention, the user positions cursor 300 to a first position (reference position) 310 on the display where an object is displayed. Here position 310 is the first position, however, any point on the object could also be selected, such as the center of gravity, a point of the object, etc.

As described earlier, the first position 310 on the display is then associated with a first location 290 in the coordinate system of the application, as illustrated in FIG. 5b. In the preferred embodiment of the present invention this step occurs in response to the user clicking a mouse button, for example. To indicate that corner 290 has been selected, the display may display an indicator mark 320, to the user.

Figure 6A:
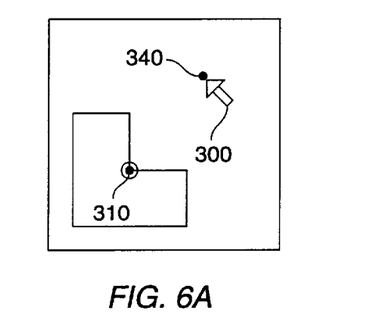
FIGS. 6a–6c illustrate one embodiment of the step in the present invention that may follow FIGS. 5a and 5b.
Figure 6B:
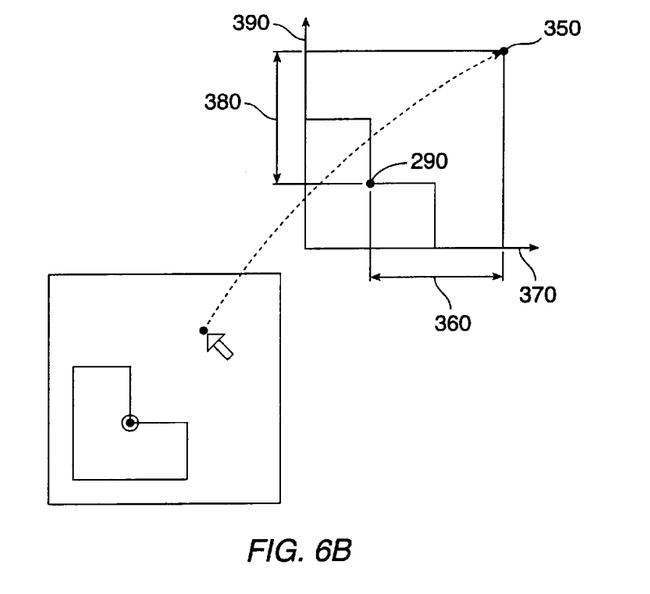
Figure 6C:
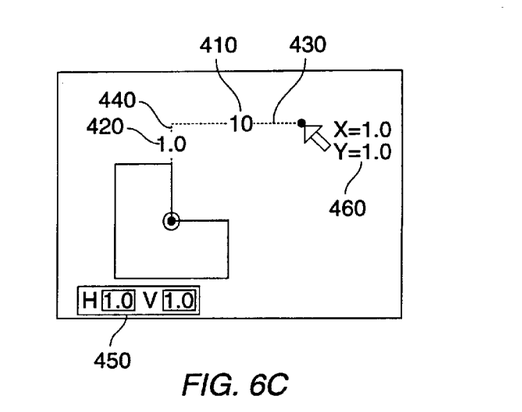

FIGS. 6a–6c illustrate one embodiment of the step in the present invention that may follow FIGS. 5a and 5b. In FIG. 6a, cursor 300 is moved to an arbitrary second position 340 on the display. As illustrated in FIG. 6b, this second position 340 is then mapped to a second location 350 in the coordinate system. Based upon the differences between the first location 290 in the coordinate system, and the second location 350 in the coordinate system, offsets as defined by the coordinate system are then determined. FIG. 6b illustrates an example of a horizontal offset 360 in the x-axis 370, and a vertical offset 380 in the y-axis 390. The resulting offsets can then be displayed to the user as illustrated in FIG. 6c. As illustrated, the horizontal offset amount 410 and the vertical offset 420 amount, can be displayed to the user with the aid of temporary coordinate system lines 430 and 440, by a display box 450, or simply next to the cursor 460. Preferably, this process repeats for most positions of cursor 300 on the display, after first location 290 is determined. This to the user, resulting offsets for most positions of cursor 300 on the display are displayed in user "real-time".

Alternatively, offsets for the position of cursor 300 are displayed to the user after the cursor pauses for a period of time at a second position on the display.

Figure 7A:
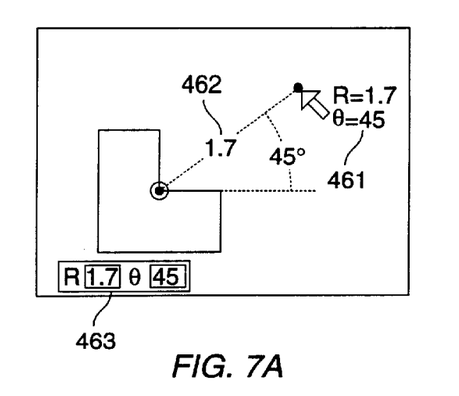
FIGS. 7a and 7b illustrate a display of offsets under different coordinate systems.
Figure 7B:
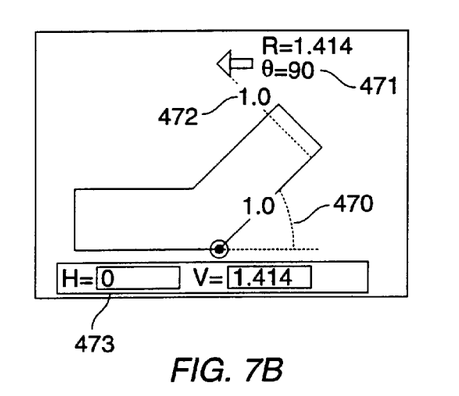

FIGS. 7a and 7b illustrate a display of offsets under different coordinate systems. As previously discussed, the present invention may be embodied under numerous coordinate systems. In FIG. 7a, a polar coordinate system is illustrated and the offsets are shown in alternative embodiments (461, 462, and/or 463). In FIG. 7b, a rectangular coordinate system that has been rotated 40° (470) is illustrated and the offsets within the rotated coordinate system are shown in alternative embodiments (471, 472, and/or 473). The amount of rotation for the coordinate system is user selectable using well known techniques such as key-ins or graphical manipulation using a pointing device. In the preferred embodiment of the present invention, different coordinate systems can be interchangeably or simultaneously selected for determining the offset within the same application program. For example, in FIG. 7b, the offset can be displayed in polar coordinates as R=1.414, $\theta$=85°, x-y coordinates as shown, or rotated x-y coordinates as shown, etc.

Values for the various offsets can be typically positive or negative in value. For example, a cursor location below and to the left of a reference location will preferably return a negative offset in the x and y direction. As another example, a cursor location below a reference location will preferably return a positive magnitude value, but a negative angle value in a polar coordinate system.

Figure 8A:
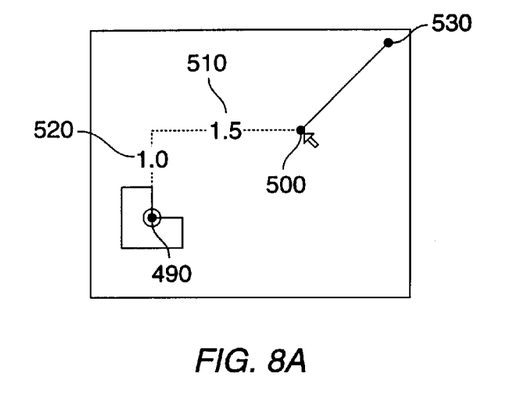
FIGS. 8a and 8b illustrates uses of embodiments of the present invention.
Figure 8B:
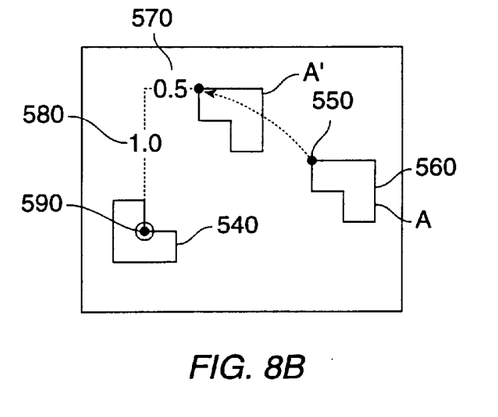

FIGS. 8a and 8b illustrates uses of embodiments of the present invention. In FIG. 8a, once the offset between corner 490, and the cursor position 500 can be determined within the application coordinate system, the user can precisely place objects relative to corner 490. In FIG. 8a, one end-point of a line is placed at a particular horizontal offset 510, and at a particular vertical offset 520 relative to corner 490, the user then moves the cursor to a second position 530 on the display to define the other end-point of the line. Alternatively, the user may select position 530 first and then determine position 500 as the second end point.

In FIG. 8b, the application program may use a combination of a "drag and drop" feature for an object 560 with the above described positioning method. As shown in FIG. 8b, a selected point 550 on object 560, may be used as the "second position" for the positioning methods. After reference location 490 has been selected, point 550 is selected. Initially, point 550 and object 560 are at position A, next object 560 is dragged around the display. Object 560 is placed on the display in position A' when the user is satisfied with the location of point 550 at particular horizontal offset 570 and a particular vertical offset 580 relative to point 590.

Figure 9:
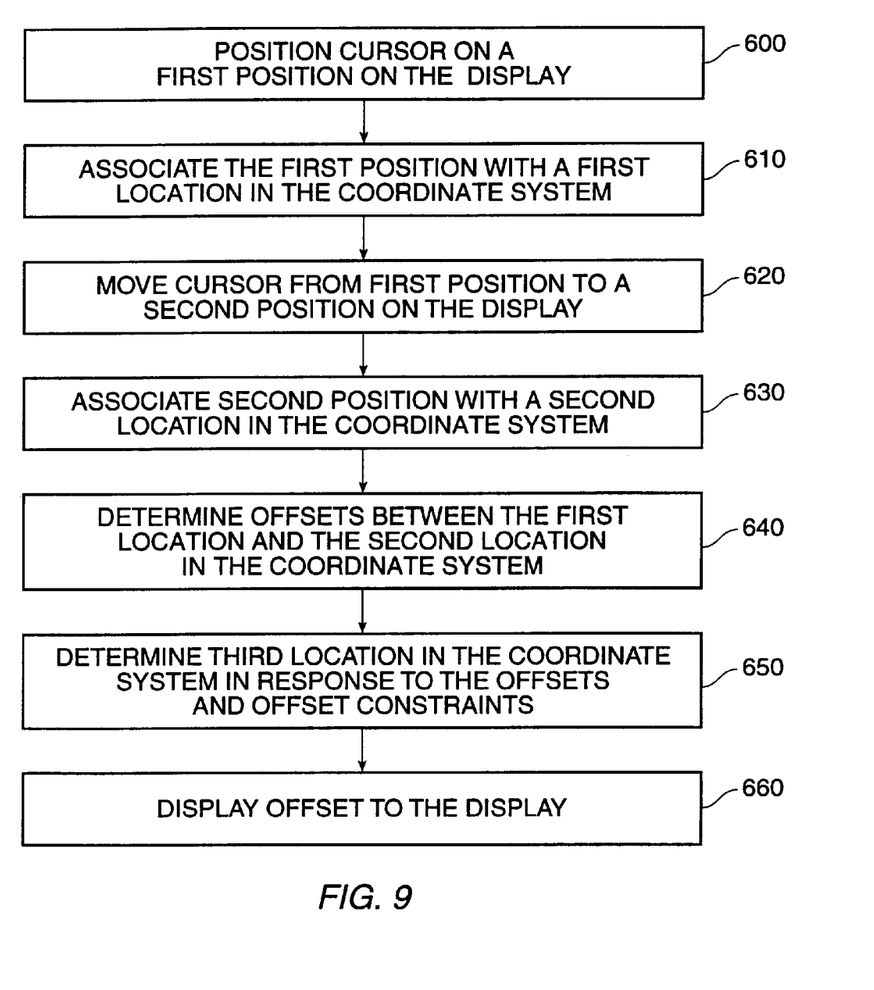
FIG. 9 is a flow diagram of another embodiment of the process of determining a position of a cursor on the display.

FIG. 9 is a flow diagram of another embodiment of the process of determining a position of a cursor on the display. Initially a cursor is positioned on the display at a first position using a pointing device, such as a mouse (step 600). In the preferred embodiment of the present invention, the position is typically coincident with a position of a reference point on an object on the display. Again, this first position may be on an object or related to the object, e.g. center of gravity, an axis of rotation, etc., for example. The first position is then associated with a first location within a coordinate system defined by the application program (step 610). This step may utilize conventional cursor drivers in addition to software possibly in an application program that translates the cursor position to the specific coordinate system of the application program.

Next, the cursor is moved from the first position to a second position (step 620). In the preferred embodiment of the present invention, the second position is simply an arbitrary position on the display that is not coincident the first position. This step is typically performed with the pointing device. Each second position on the display is then associated with a second location within the application program coordinate system (step 630). Again, this step may utilize conventional cursor drivers as described above. In the preferred embodiment of the present invention, the second location is also simply an arbitrary position on the display that is not coincident with the first location.

Next, offset values between the first location and the second location, within the coordinate system is determined (step 640). The coordinate system may be predetermined or selected by the user. In the preferred embodiment, a rectangular two-dimensional coordinate system is used, however alternative coordinate systems are envisioned including a polar coordinate system, an orthogonal three-dimensional coordinate system, and a spherical coordinate system.

Based upon the offset values and offset constraints, a third location within the coordinate step is determined (step 650). An offset constraint constrains a value for an offset in the given coordinate system. In the preferred embodiment of the present invention, the offset constraints are determined by the user, typically through a dialog box. The resulting offset values, defined by the coordinate system, including the constrained offsets, are then displayed to the user (step 660), typically on a display.

Figure 10A:
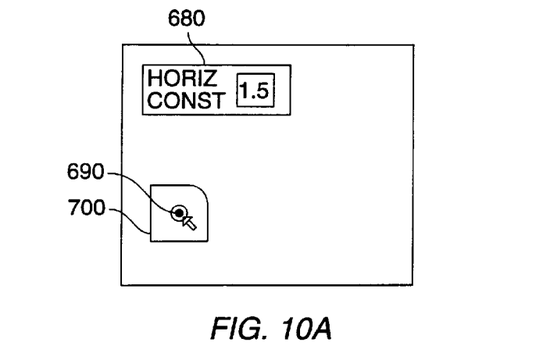
FIGS. 10a–10d illustrate one embodiment of the step in the present invention.
Figure 10B:
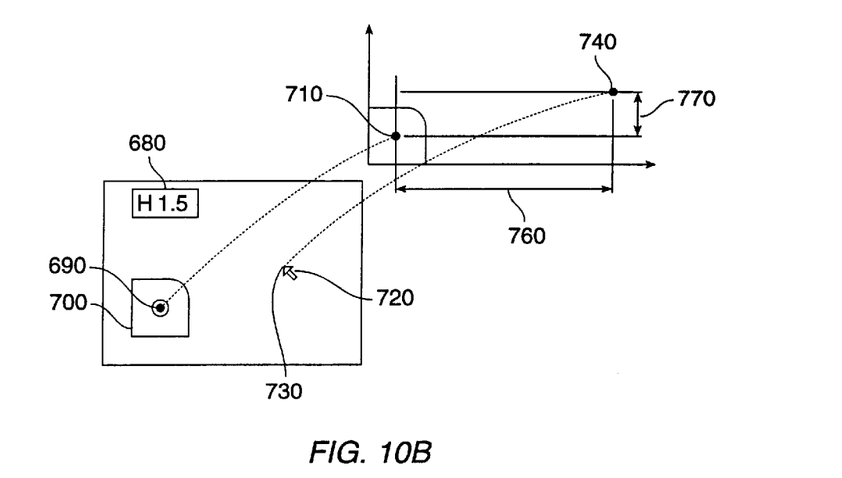

FIGS. 10*a*–10*d* illustrate one embodiment of the step in the present invention. In FIG. 10*a*, dialog box 680, allows the user to constrain an offset from the first position (reference position) 690, for example, an axis rotation in the x-y plane, on an object 700. In FIG. 10*a* the value is 1.5. As illustrated in FIG. 10*b*, the user then moves cursor 720 to an arbitrary second position 730 on the display. This second position 730 is then mapped to a second location 740 in the coordinate system. Based upon the differences between the first location 710 in the coordinate system, and the second location 740 in the coordinate system, offsets, as defined by the coordinate system are then determined. This is illustrated as 760 from the horizontal offset and 770 for the vertical offset.

Figure 10C:
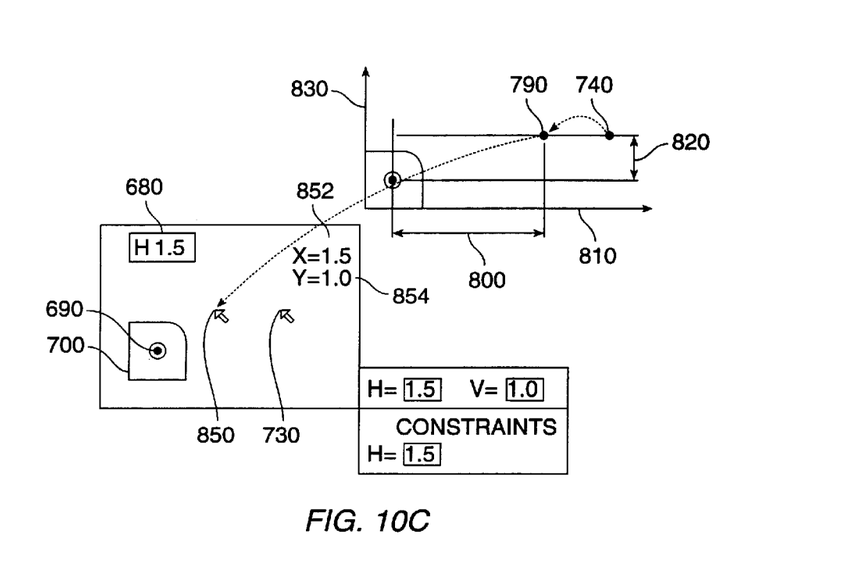

As illustrated in FIG. 10*c*, a third location 790 in the coordinate system is then determined in response to the offsets and the constrained offset. FIG. 10*c* illustrates an example of a constrained horizontal offset 800 as defined in dialog box 680 in the x-axis 810, and a variable vertical offset 820 in the y-axis 830. A third position 850 corresponding to the third location 790 and the resulting offsets 852 and 854 can then be displayed to the user. As noted in the example, horizontal offset 852 is locked to 1.5 while vertical offset 854 is variable and is currently set to 1.0.

In the preferred embodiment of the present invention, the cursor will not "jump" dramatically as shown in positions 730 and 850, because the above steps are repeatedly performed for multiple cursor positions. In the preferred embodiment, to the user, the constraints simply limit where the cursor can place objects within the application coordinate system and does not limit other cursor activities, such as selecting alternative functions.

Figure 10D:
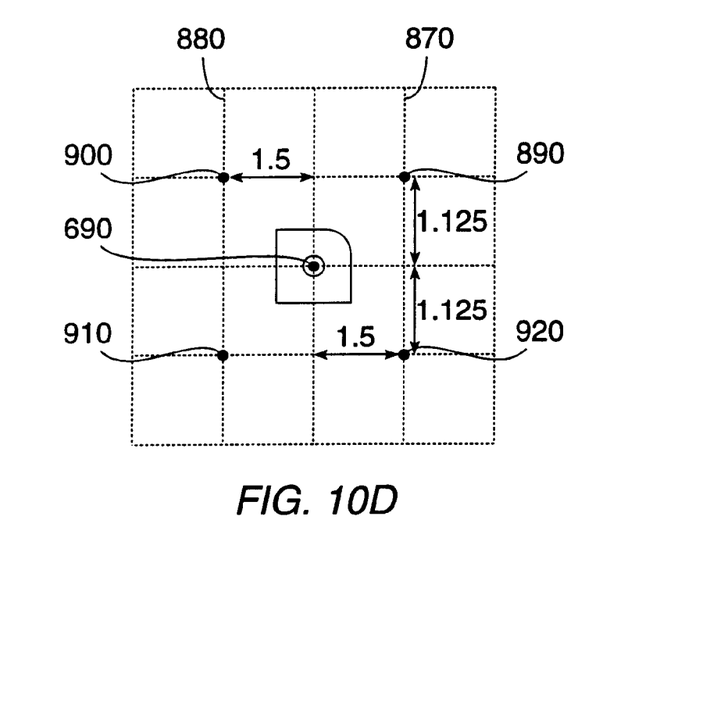

In FIG. 10*d*, lines 870 and 880 illustrate positions on the display (in the coordinate system) where objects may be positioned, using the horizontal constraint of 1.5 from above. If the user adds vertical constraints of 1.125, for example, in addition to the horizontal constraint above, points 890–920 illustrate the only four possible positions where objects may be located, relative to first position 690. Lines 870 and 880 may or preferably may not be displayed to the user as illustrated in FIG. 10*d*.

Figure 11A:
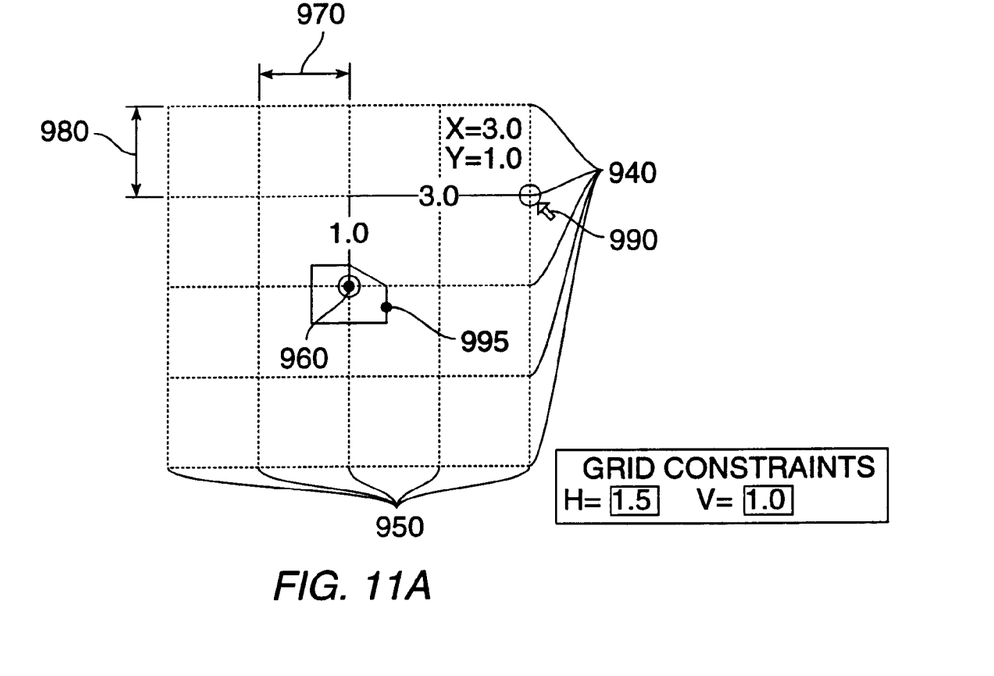
FIGS. 11a and 11b illustrate positions on the display where objects may be positioned relative to a reference position using a defined grid spacing.
Figure 11B:
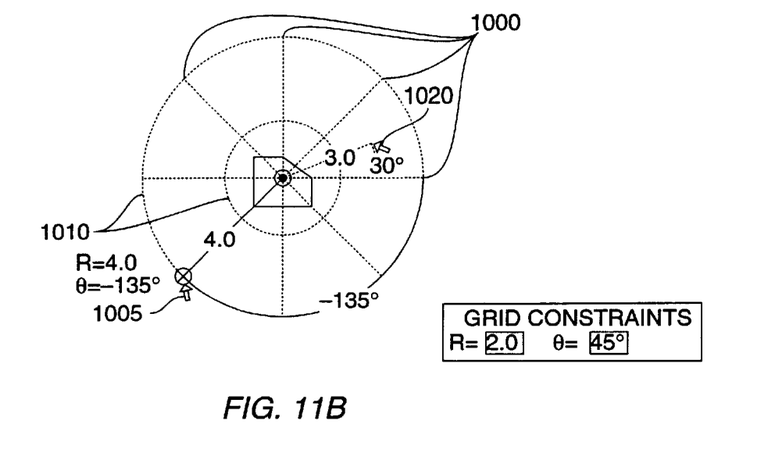

In FIGS. 11*a* and 11*b*, lines 940 and 950 illustrate positions on the display (in the coordinate system) where objects may be positioned relative to a reference position 960, using a defined grid spacing 970, 980. Reference/position 960 is, for example, the center of gravity of the object illustrated.

In this embodiment, the user initially defines a "grid" spacing 970, 980 either via keyboard key-ins or with interactive definition using the pointing device. The grid typically constrains the horizontal and vertical spacing of the cursor relative to the reference position, in FIG. 11*a*, reference position 960. As the user moves the cursor on the screen, the user may notice that the positions in which objects can be defined or placed is constrained to places where lines 940 and 950 intersect. As illustrated in FIG. 11*a*, grid spacing 980 is set to 1.0, and grid spacing 970 is set to 1.5, thus the location of the cursor 290 is illustrated to be 1.0 and 3.0 units away from reference position 960. As opposed to conventional absolute grid spacing, the preferred embodiment of the present invention allows for dynamic definition of the origin for the grid. In this example, position 960 was chosen, alternatively position 995 could also have been used as the reference position, thus, lines 940 and 950 would be shifted accordingly.

In an alternative embodiment, the "grid" spacing can be defined in terms of multiples of degrees, and multiples of units in magnitude for a polar coordinate system, as illustrated by lines 1000 and 1010, respectively. The positions in which objects can be defined or placed is thus constrained in a spider-web type grid. In FIG. 11*b*, the grid spacing for the magnitude 1010 is set to 2.0 and the grid spacing for the angle 1010 is set to 45 degrees, thus the location of the cursor 1005 is illustrated to be negative 135 degrees (or positive 225 degrees).

The offset values in the application coordinate system may be displayed to user, although the user is still constrained to "grid" intersections. For example, if the cursor is located at 1020, the magnitude and degree may be displayed, however, the user can only locate objects at the intersection of lines 1000 and 1010. Alternatively, the user may only be displayed offset values in terms of multiples of the "grid" spacing.

In yet another embodiment, the user may locate objects at positions other than at "grid" intersections. In such a case, offset values displayed to the user are displayed in normal characters, however, when the cursor is on a grid line, the offset value is displayed in bold face type. This allows the user to know when the cursor is on a grid line, however, does not limit the positioning of the cursor and of objects on the display. As indicated previously, a mix of techniques and coordinate systems may be used in a single document. Lines 940, 950, 1000, and 1010 preferably are not displayed to the user, as was illustrated in FIGS. 11A and B.

Figure 12:
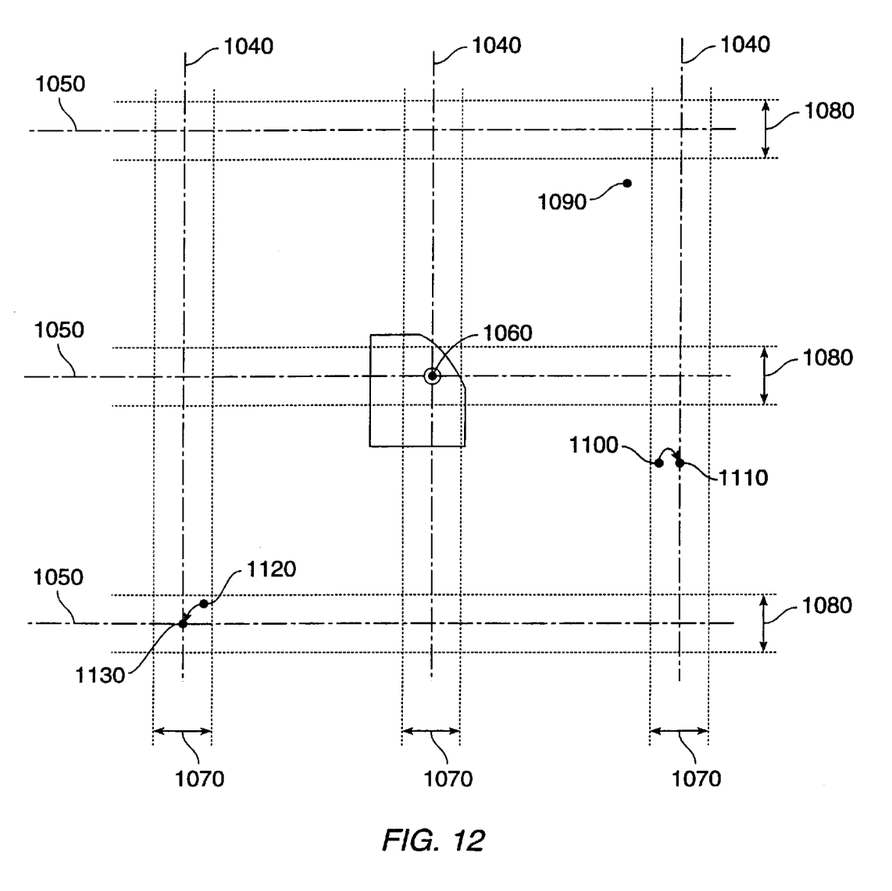
FIG. 12 illustrates another embodiment of the present invention.

FIG. 12 illustrates another embodiment of the present invention. In FIG. 12 lines 1040 and 1050 illustrate grid lines on the display (in the coordinate system) relative to reference position 1060. Lines 1040 and lines 1050 include biasing regions 1070 and 1080, respectively. The display also includes sample cursor positions 1090, 1100, 1110, 1120, and 1130.

In this embodiment, the "grids" do not constrain positions for cursor 1090 on the display, however, the "grids" bias cursor positioning. If the cursor position is within a biasing range, for lines 1040, in region 1070, and for lines 1050, in region 1080, the cursor is automatically positioned on the closest biasing line or lines. For example if the cursor is positioned at point 1090, the cursor is not biased, if the cursor is positioned at point 1100, the cursor is biased (is moved) to point 1110 on grid line 1040, and if the cursor is positioned at point 1120, the cursor is biased (is moved) to point 1130 on grid lines 1040 and 1050. In response, the user will be displayed the cursor position for cursor position 1090, cursor position 1110, and cursor position 1130, respectively.

This embodiment aids the user to more precisely place or move objects in a simple manner while allowing the user to place objects relative to reference position 1060 at positions other than "grid" crossings. The specific bias ranges around the "grid" lines may be user selectable or pre-programmed. None of the "grid" lines or regions are preferably displayed to the user. These lines are illustrated in FIG. 12 for clarity.

Conclusion

In the foregoing specification, the invention has been described with reference to specific exemplary embodiments thereof. Many changes or modifications are readily envisioned. For example, applying the invention in a three-dimensional coordinate system by, for example, allowing the user to choose a first two-dimensional plane and then applying the invention disclosed above, enhancing the "biasing" scheme to increase the range of "bias", allowing the user to dynamically define constraints and grid spacings using the pointing device, etc.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer system having a processor for displaying an offset value relative to a reference position on a display, the computer system further comprising:
    a display coupled to the processor;
    a user input device coupled to the processor; and
    a computer readable storage media coupled to the processor comprising:
        code that directs processor to display the cursor at a first position on the display in response to input from the user input device, the first position associated with an object on the display;
        code that directs the processor to use the first position on the display as the reference position on the display;
        code that directs the processor to display the cursor at a second position on the display in response to input from the user input device, the second position not on an edge of the object on the display; and
        code that directs the processor to display the offset value on the display, the offset value being determined in response to the reference position and the second position.

2. The computer system of claim 1 wherein the second position on the display is constrained in response to the reference position and a predefined value.

3. The computer system of claim 1 wherein the computer readable storage media further comprises:
    code that directs the processor to display the cursor at a third position on the display in response to input from the user input device, the third position associated with another object on the display;
    code that directs the processor to select the another object on the display in response to input from the user input device; and
    code that directs the processor to move the another object on the display in response to input from the user input device moving the cursor from the third position to the second position on the display.

4. The computer system of claim 3 wherein the third position is on a surface of the another object.

5. The computer system of claim 1 wherein the first cursor position is located on a corner of the object.

6. The computer system of claim 1 wherein the offset value comprises at least two offset values between the first position and the second position.

7. The computer system of claim 6 wherein the at least two offset values have orthogonal measurement axes.

8. The computer system of claim 6
    wherein the object is a three-dimensional object, and
    wherein the first position on the display is associated with a surface plane of the object.

9. The computer system of claim 8
    wherein the object is a three-dimensional object, and
    wherein the first position on the display is associated with a corner of the object.

10. The computer system of claim 8
    wherein the object is a three-dimensional object, and
    wherein the first position on the display is associated with a center of gravity of the object.

11. The computer system of claim 2 wherein the second position on the display is constrained in response to multiples of the predefined value.

12. The computer system of claim 1 wherein the computer readable memory further comprises:
    code that directs the processor to display the cursor at a third position on the display in response to the second position on the display when the second position is within a biasing region of the third position on the display; and
    code that directs the processor to display another offset value on the display, the another offset value being determined in response to the reference position and the third position.

13. A method for displaying an offset value relative to a reference position on a display, comprising the steps of:
    displaying the cursor at a first position on a display in response to input from a user input device, the first position associated with an object on the display;
    selecting the first position on the display as the reference position on the display;
    displaying the cursor at a second position on the display in response to input from the user input device, the second position not on an edge of the object on the display; and
    displaying the offset value on the display, the offset value being determined in response to the reference position and the second position.

14. The method of claim 13 wherein the step of displaying the offset value comprises displaying a plurality of offset values within a user-defined coordinate system.

15. The method of claim 13 further comprising the steps of:
    displaying the cursor at a third position on the display in response to input from the user input device, the third position associated with another object on the display;

selecting the another object on the display in response to input from the user input device; and moving the another object on the display from the third position on the display to the second position on the display.

16. The method of claim 15 wherein the third position is on a surface of the another object.

17. The method of claim 13 wherein the first cursor position is located on a corner of the object.

18. The method of claim 13 wherein the offset value comprises at least a pair of offset values between the first position and the second position.

19. The method of claim 18 wherein the at least pair of offset values have orthogonal measurement axes.

20. The method of claim 18 wherein the object is a three-dimensional object, and wherein the first position on the display is associated with a surface plane of the object.

21. The method of claim 18 wherein the object is a three-dimensional object, and wherein the first position on the display is associated with an edge of the object.

22. The method of claim 18 wherein the object is a three-dimensional object, and wherein the first position on the display is associated with a center of gravity of the object.

23. The method of claim 13 further comprising the step of determining a predetermined value;

wherein the second position on the display is constrained in response to multiples of the predetermined value and the reference point.

24. The method of claim 13 further comprising the step of displaying the cursor at a third position on the display in response to the second position on the display, when the second position is within a biasing region of the third position on the display; and displaying another offset value on the display, the another offset value being determined in response to the reference position and the third position on the display.

25. The method of claim 13 further comprising the step of drawing a new object on the display after the step of displaying the offset value on the display.

26. An apparatus for positioning a cursor on the display relative to a reference position on a display, the apparatus comprising:

a user input device for moving the cursor to a plurality of positions on the display including a first position and a second position, and for selecting the first position on the display as the reference position;

a display for displaying an object, for displaying the cursor at the first position in response to input from the user input device, the first position associated with the object, for displaying the cursor at the second position in response to input from the user input device, the second position not associated with the object, and for displaying an offset value, the offset value being determined in response to the reference position and the second position.

27. The apparatus of claim 26 wherein the offset value comprises a plurality of offset values within a user-defined coordinate system.

28. The apparatus of claim 27 wherein the user-defined coordinate system includes an angle and a magnitude.

29. The apparatus of claim 27 wherein the user-defined coordinate system is orthogonal.

30. The apparatus of claim 26 wherein the first cursor position is located on a corner of the object.

31. The apparatus of claim 26 wherein the offset value comprises at least a pair of offset values between the first position and the second position.

32. The apparatus of claim 26 wherein the object is a three-dimensional object, and wherein the first position is associated with a surface of the object.

33. The apparatus of claim 26 wherein the object is a three-dimensional object, and wherein the first position on the display is associated with a center-line of the object.

34. The apparatus of claim 26 wherein the object is a three-dimensional object, and wherein the first position on the display is associated with a corner of the object.

35. The apparatus of claim 26 wherein the second position on the display is constrained in response to multiples of a predetermined value and the reference point.

36. The apparatus of claim 26 wherein the display is also for displaying the cursor at a third position on the display in response to the second position on the display, when the second position is within a biasing region of the third position on the display, and for displaying another offset value on the display, the another offset value being determined in response to the reference position and the third position on the display.

* * * * *